United States Patent Office 2,871,133
Patented Jan. 27, 1959

2,871,133
INORGANIC DUST TREATMENT PROCESS

Carl V. Palonen and Elbert W. Kaiser, Dearborn, Mich., assignors to Peerless Cement Corporation, Detroit, Mich., a corporation of Michigan No Drawing. Application December 10, 1956
Serial No. 627,116

17 Claims. (Cl. 106—100)

This invention relates to the treatment of inorganic dust to remove alkali metal oxide materials therefrom. More particularly, this invention relates to the treatment of the flue dust recovered in the manufacture of cement clinker for the purpose of recovering the chemical values in the alkali metal oxides and so processing the remaining dust solids that they can subsequently be used in the manufacture of cement clinker.

In the manufacture of cement there is produced a large quantity of kiln dust. For instance, Rogers Manual of Industrial Chemistry, volume I, p. 862 (6th edition), estimates the amount of such dust to be from 3 to 5 percent of the total raw materials.

Under present conditions, large amounts of this dust is lost or wasted. Thus, in addition to being a waste of potentially valuable material it also presents a serious air, or stream pollution problem, or dumping problem. Various costly solutions to the pollution problem have been suggested and used, such as settling chambers, water sprays and electrical precipitators, all of which merely remove the solid dust particles from suspension in an air or gas stream.

The recovered dust particles as recovered are largely unsuitable for use in cement manufacture. Under current practices in the industry a large portion of the recovered dust is disposed of as waste. This adds to the manufacturing cost of the cement, is a waste of potentially valuable materials, and creates serious disposal problems.

It has been found that the dust is unsuitable for cement manufacture because it contains a relatively large proportion of materials reported generally as alkali metal oxides, or $Na_2O$ and $K_2O$, henceforth referred to as alkalies. These alkalies have volatilized from the other materials in the kiln, condensed on the dust particles and then been carried out of the kiln in the dust. Substantial portions of these alkalies are "combined" in the dust, that is, they are not readily removed from the dust when leached with water. The remainder of these alkalies is in a free or "uncombined" state and can be leached with water. The high alkali content of these dusts have been found to have a detrimental effect on the finished concrete made from cement in which untreated dusts have been incorporated.

In addition, if the dust as recovered is recycled to an intermediate point in the cement manufacturing process and passed through the kiln, we have found that the alkalies may not be volatilized from the dust particles and thereby create additional problems within the kiln. The alkalies in the dust have the effect of lowering the fusion temperature of the other materials in the kiln and because of the increased fluidity therein, will cause a reduction of the refractory protecting layer built up inside of the kiln. Also, the presence of substantial quantities of free alkalies in the kiln materials during the burning process results in the formation of free lime as an equilibrium product. This free lime produces an unsatisfactory cement.

Therefore, it is an object of this invention to provide a method of treating recovered cement kiln dust to permit its use in cement manufacturing processes.

It is a further object of this invention to provide a method for treating recovered cement kiln dust which will make it suitable for use in the cement manufacturing process and which will render it suitable for burning with the other raw materials in the kiln.

It is still a further object of this invention to provide a method for treating cement kiln dust which will permit it to be recycled through the kiln without altering the normal operating conditions of the kiln.

It is a further object of this invention to provide a method for treating recovered cement kiln dust to increase the water-solubility of a substantial portion of the alkalies in the dust for the purpose of facilitating the removal thereof from the dust.

Still further, it is an object of this invention to provide a rapid and effective method of agglomerating recovered cement kiln dust materials to facilitate the handling and treatment thereof.

Further, it is an object of this invention to provide a process for treating recovered cement kiln dusts to produce a solid product substantially corresponding in chemical composition to that of the burned clinker as it is discharged from the cement kiln.

It is a further object of this invention to provide a method for removing and recovering a substantial portion of the water-soluble alkalies from an inorganic cement kiln dust thereby to produce a useful leached solid product.

Still further, it is an object of this invention to provide a method of removing the "combined" alkalies from cement kiln dusts by a leaching process with the resultant production of a leaching solution which contains the alkali metal salts in suitable form for subsequent utilization, as for example, in fertilizer manufacture.

These and other related objects are accomplished by the present invention which includes in one of its embodiments the several methods of agglomerating the recovered dust material with an aqueous medium, subjecting the resultant agglomerated material to heat-treatment until the "combined" alkalies are rendered soluble, leaching the resultant material with an aqueous medium to dissolve and remove a substantial portion of the water-soluble chemicals therein, and recovering therefrom a substantially water-insoluble dust product.

The present invention is based in part upon our discovery that the recovered kiln dust is altered by a second heat-treatment so that a substantial portion of the previously "combined" alkalies in the dust can be leached readily therefrom with water.

It is not definitely known how the "combined" alkali metal oxides are bonded or held in the dust and thus rendered so difficult to dissolve in water. As used herein, the phrase "combined" alkalies denotes that portion of the total alkali content which is difficult to dissolve in aqueous solutions as compared to the "uncombined" alkali portion which dissolves more readily. In the following description the percentages and ratios given are by weight unless otherwise indicated.

The following samples show typical chemical content of such dust materials:

*Sample A.*—A large sample of precipitated Portland cement kiln flue dust was taken from a typical electrical precipitation apparatus such as a "Cottrell Precipitator." The sample was analyzed in accordance with the method described in chapter 10 of "Commercial Methods of Analysis" by Snell and Biffen, published by the McGraw-Hill Book Company, 1944. The composition was found to be as follows:

| | Percent by weight |
|---|---|
| $SiO_2$ | 17.50 |
| $Al_2O_3$ | 7.66 |
| $Fe_2O_3$ | 3.58 |
| $CaO$ | 34.18 |
| $MgO$ | 1.64 |
| $SO_3$ | 13.20 |
| Ignition loss | 10.92 |

The kiln dust sample was further analyzed for alkali content in accordance with the standard ASTM flame photometer method: ASTM–C114–51T. (In this sample the dust contained an acid insoluble silicate; so in the fusion step of this standard method, the procedure of ASTM–C114–53, Sections 22a, 22b and 22c, were followed to where ammonium oxalate is added. At this point the mixture was evaporated to reduce the volume and from there the standard photometric method was used.) The composition was found to be as follows:

|  | Percent by weight |
|---|---|
| Total $Na_2O$ | 1.44 |
| Total $K_2O$ | 10.00 |

*Sample B.*—In determining the amount of water-soluble or "uncombined" alkali metal oxides present in the dust sample of Sample A, a one-gram portion of the dust was mixed in a beaker with fifty cubic centimeters of distilled water. This beaker was heated to boiling and held at a low boil for fifteen minutes. The hot mixture was then filtered into an one-hundred milliliter volumetric flask, into which five cubic centimeters of concentrated HCl and ten cubic centimeters of 6.3 percent calcium chloride solution had been added. The beaker and filter cake were washed with hot distilled water and added to the volumetric flask until one-hundred milliliters of volume had been obtained in the flask. This solution was used in the flame photometer, as in Sample A, to determine the amount of dissolved sodium and potassium salts. Based on the weight of the dust, these results are as follows:

|  | Percent by weight |
|---|---|
| "Uncombined" $Na_2O$ | 0.52 |
| "Uncombined" $K_2O$ | 6.20 |

From a consideration of Samples A and B, it can be seen that only about 36.1 percent of the total sodium oxides and only about 62.0 percent of the total potassium oxides were leached readily from the dust as it was withdrawn from the "Cottrell Precipitator." In general, these potential percentages of total alkali metal oxides which can be removed are not sufficient to eliminate the undesirable effects caused in the kiln referred to above. It is necessary therefore to provide a practical commercial method to render a substantial portion of the "combined" alkalies more readily soluble in water.

While the invention is particularly useful in the Portland cement manufacturing process, it is not to be limited thereto as the treated dust may be used for other purposes as well.

SOLUBILIZATION

The kiln dust may be subjected to any suitable temperature which solubilizes the "combined" alkalies, that is, causes them to be more readily soluble in aqueous leaching media. It has been found that this temperature can be varied over a wide range depending on the other properties desired in the solubilized kiln dust and the purpose for which the treated dust will be used. Temperatures high enough to permit fusion of the dust may be desirable, especially when the treated dust is to be added to the cement clinker or to some other intermediate material in the cement manufacturing process.

The fusion temperature will vary somewhat with the dust composition. It has been noted, for instance, that the smaller dust particles contain a larger proportion of alkalies (which are known to lower the fusion temperature), than do the relatively larger particles recovered from the kiln flue dust. Further, the fusion temperature may vary because of certain ingredients which may have been added to the dust, such as limestone or sand. Still further, the fusion temperature may vary with the particular cement being manufactured, since the compositions and fusion temperatures of the clinker may differ.

Solubilization temperatures below the fusion temperature of a particular inorganic dust composition also may be desirable. When Portland cement kiln flue dust is first agglomerated with water and when the treated dust is to be recycled to the kiln, it is preferred to solubilize the dust at temperatures above about 1000 degrees Fahrenheit. As the solubilization temperature is increased, less time is required to solubilize the alkalies in the kiln dust. Therefore, the optimum temperature selected may depend in part on the particular purpose for which the treated dust is to be used. Temperatures between about 1000 degrees Fahrenheit and about the fusion temperature of the dust are preferred.

Further, it has been noted that chemicals such as calcium chloride added to the dust may permit the use of lower solubilization temperatures than could otherwise be used. Such additions also may decrease the solubilizing time required. The ultimate composition of the dust also may be adjusted by suitable additions of other materials to be more in conformity with the desired materials for which it is to be used or recycled. The materials added also may aid in increasing the apparent particle size of the dust. The added materials also may aid in permitting a more uniform heat-treatment of the dust as well as aiding in volatilizing some of the alkalies during the solubilization step.

Additions of coal, lime, sand, silica, limestone, calcium carbonate, calcium hydroxide, clay or other materials have been found to produce one or more of the foregoing advantages. Addition of calcium chloride or coal in amounts ranging from between about 0.01 percent to about ten percent by weight, especially about one percent, have been found to improve the dust treatment process. Additions of calcium carbonate in the ratio of about 36.8 parts of $CaCO_3$ to 100 parts dust also gave some increased solubilization of the alkalies at temperatures between about 2000 degrees Fahrenheit and about 2600 degrees Fahrenheit when heated for time intervals varying from between about fifteen minutes to about sixty minutes. Likewise, additions of about 33.8 percent limestone to dust when heated to about 1200 degrees Fahrenheit and about 1800 degrees Fahrenheit for one hour gave improved solubility of the alkalies; so also did additions of about 35 percent and about 10 percent lime (CaO) to the dust. Other additives which may be effective are disclosed herein in connection with, but not limited to the preferred agglomeration step of this invention.

The dust may be heated in any suitable apparatus. When operating at high temperatures, a rotary kiln or traveling grate kiln, or fluo-solids reactor may be preferred, but this invention is not to be limited thereto except as defined in the appended claims.

Any suitable time may be employed in the solubilization step of this invention. In general, as short a time as possible is desirable. Times ranging from a brief period of seconds required to bring the dust up to the desired temperature in a fluo-solids reactor, to as long as three hours or more may be employed without departing from the scope of this invention.

AGGLOMERATION

In a preferred embodiment of this invention an aqueous medium is added to the dust to effect its agglomeration prior to its being subjected to the solubilization step. Agglomeration of the dust with an organic liquid medium such as fuel oil, also may be used. It has been found that the agglomerated dust permits handling in such a manner as to reduce the dustiness of the handling area in the plant. Further, it has been found that when an aqueous medium is added to permit the dust to be flaked or nodulized, the slight compacting of the dust particles which results tends to cause the particles to adhere together after the heat-treatment.

The aqueous medium used to agglomerate the kiln dust preferably is untreated water or it may be a waste aqueous medium, such as spent pickling bath from a steel mill, Solvay lime mud slurry, waste sulfite liquors, or waste heat cooling water. Solutions containing one or more soluble ions of silicate, chloride, sulfate, calcium, magnesium or aluminum and slurries containing these ions in various combined states may be particularly useful in adjusting the overall composition of the dust to be more in conformity with that of the material at the intermediate point in the cement manufacturing process to which it is to be recycled or with that of the other materials with which the treated dust is to be used.

We also have discovered that certain chemicals in the aqueous medium may act as a binding agent for the dust and thereby permit a reduction in the amount of water to be added in the agglomeration step. Further, since the dust has hydraulic properties, such chemicals may accelerate the hydration of the dust and thereby cause an increased rate of change in its properties. One preferred chemical which may be added is calcium chloride. The hygroscopic properties of calcium chloride help to maintain the desired moisture content in the dust, so that the agglomerated dust has a substantially uniform moisture content which reduces the dustiness of the material while being handled. In addition, the added calcium brings the overall composition of the dust into closer comformity with the composition of the materials used in the cement manufacturing process. It is known that calcium chloride increases the hydration of cement and it appears that its use also contributes to a similar reaction in the cement kiln dust.

The direct addition of other materials such as limestone, clay, sand, silica, calcium carbonate or other cement-making raw material, also may be highly desirable, especially where the treated dust is to be returned to be blended with the clinker product of the kiln. Not only are acidic and basic additive chemicals useful to the treating process of this invention, but organic additives, such as sugar, detergents, fuel oil, coal or cornstarch, also aid both in acting as a binder for the dust and in reducing the amount of heat energy required to achieve the "solubilizing" temperatures. Upon heating of the dust having an organic binder in it, the organic material will ignite and pass off as volatile or oxidized material and thus may not alter the overall composition of the heated inorganic dust but in so doing it will supply heat units to the reaction. Mixtures of these chemicals also may be desirable. In general, the material added to the dust should be substantially free of theoretical alkali metal oxide content.

The agglomeration of the dust particles is carried out preferably in a manner which provides flakes or nodules of the solid particles. It is to be understood "nodules" include any suitable shape, such as balls, strings, pellets, cubes, blocks, etc., in any suitable size which is adaptable for either manual or mechanical handling.

The agglomeration may be done under pressure, that is, the dust as wetted may be subjected to pressures ranging from relatively low pressures up to compacting pressures as high as 10,000 pounds per square inch (p. s. i.) wherein pills, rods, cubes, bars and other shapes of agglomerated inorganic dust may be obtained. The higher compacting pressures of from about 3500 p. s. i. or above, tend to alter the porosity characteristics of the pellet and may cause a slowing of the alkali leaching process. Further, when applying pressure to the dust in the agglomeration step the leached material obtained subsequently therefrom tends to be of a considerably larger particle size than the untreated kiln dust. It may be preferable to nodulize the dust before compacting it. When compacted through mills into sheets or cakes of dampened dust, these cakes or chunks may be directly heat-treated or leached. These cakes can have thicknesses ranging from up to one-quarter inch to one-half inch and still be suitable for leaching.

The aqueous medium should be used at a suitable temperature to permit the most effective wetting and agglomeration of the kiln dust. This effective temperature range may vary with the chemical compositions of the aqueous medium and the kiln dust. It also may vary with the temperature of the kiln dust which may range from room temperature to the temperature of the dust as it is first recovered.

The relative amount of aqueous medium added to the dust depends on the specific agglomeration method used as well as the compositions of the particular dust and aqueous medium being agglomerated. In general, it is desirable to use the smallest practical amount of aqueous medium required to effectively agglomerate the material because the less water there is present, the less heat energy there is needed for heat-treating the dust. Cement kiln "Cottrell Precipitator" dust agglomerates quite readily when the agglomerate contains from between about five percent to twenty-five percent water. A preferred range for agglomerating is between about ten percent and twenty percent water in the wetted dust. When agglomerating Portland cement kiln flue dust with water and forming into nodules, the weight ratio of dust to water may range from between about thirty to one to about three to one, that is, the overall percentages of aqueous medium in the wetted dust may range between about three percent and about twenty-five percent. When the dust is to be compacted under a pressure within the range of from approximately 500 p. s. i. to approximately 2000 p. s. i., to form an agglomerated particle ranging in size from between approximately minus four-mesh to approximately minus eight-mesh, the weight ratio of dust to water preferably ranges from between approximately nineteen to one to approximately three to one. For pressure compaction of the wetted dust the amount of aqueous medium to dust should be between approximately one percent and approximately thirty percent.

Since after the agglomeration the dust is broken up into particles which are then heat-treated and subsequently leached, the particle size after agglomeration may have some effect on the efficiency of the leaching process. For instance, it has been noted that when broken up agglomerates are leached directly, there is a rapid decrease in leaching efficiency as the particle size increases. However, this effect also depends on the degree of compaction. For instance, when high pressures are used in compacting, there is less drop in leaching efficiency with increased particle size, than when lower pressures of compaction are used. In general, compacting permits the use of lower water to solids ratios during leaching, than would otherwise be desirable to use. Where factors which tend to increase the degree of hydration, such as curing time or temperature, or when calcium chloride or other accelerators to hydration are present, then these may tend to lessen the change in efficiency with change in particle size. For instance, addition of calcium chloride to the dust in small percentages up to about ten percent resulted in a decrease in leaching efficiency. However, when leaching at about 175 degrees Fahrenheit with four parts of water to one part of some sieved dust materials which had been compacted previously at 4000 pounds per square inch, cured either 21 hours or 45 hours, and which contained percentages of calcium chloride ranging from one percent up to ten percent, there was a gradual increase in leaching efficiency from about forty-nine percent up to about sixty percent. Percentages as low as 0.01 percent calcium chloride may be adequate to increase the leaching efficiency. In another series of tests, dust particles wetted with water containing calcium chloride so that the mixture was twenty percent water and one percent calcium chloride, compacted at 4000 pounds per square inch and cured under room conditions, were selectively leached with room temperature water in the ratio of four parts water to one part compacted dust. Particles of about 0.25 millimeter, about 0.45 millimeter and about 0.9 millimeter in diameter gave leaching efficiencies of about 87 percent, about 85 percent and about 83 percent, respectively. But larger particles of about 1.06 millimeters, about 3.4 millimeters and about 7.1 millimeters in diameter gave lower leaching efficiencies of about 74 percent, about 68 percent and about 52 percent, respectively. In general, however, it is preferred to compact the dust in such a manner that when the pieces are broken up, they are of a size ranging from between about minus four-mesh to about plus eight-mesh.

The following specific examples are given to further illustrate the agglomeration and heat-treating aspects of this invention, but they are not to be construed as limiting, except as defined in the appended claims.

*Example 1.*—While being mixed in a standard Hobart mixer described in ASTM C305–55T, water was added to a portion of cement kiln dust recovered from a "Cottrell Precipitator." The wetted dust contained five percent water and was placed in an hydraulic press and compacted into flakes. These flakes were then placed in an electric resistance muffle open to the atmosphere and maintained for one hour at a temperature of about 2000 degrees Fahrenheit as measured by a thermocouple. After cooling, the heat-treated dust was analyzed in accordance with the procedures described in Samples A and B and found to be as follows:

| | Total Alkali, Percent | | Water Soluble, Percent | | Percent of Total Alkali as Water Soluble, Percent | |
|---|---|---|---|---|---|---|
| | $Na_2O$ | $K_2O$ | $Na_2O$ | $K_2O$ | $Na_2O$ | $K_2O$ |
| Dust not heated | 1.38 | 8.45 | 0.65 | 6.00 | 47.1 | 71.0 |
| Dust heated one hour at 2000 degrees Fahrenheit | 1.58 | 10.30 | 1.40 | 10.00 | 88.6 | 97.1 |

*Example 2.*—A portion of the large sample of cement kiln dust recovered from the "Cottrell Precipitator" which analyzed as shown in Samples A and B was agglomerated with ten percent water, placed in the muffle, and heat-treated in a manner after Example 1, except that the flaked dust was heated to a temperature of about 1200 degrees Fahrenheit for one hour. Upon analysis the results were as follows:

| | Total Alkali, Percent | | Water Soluble, Percent | | Percent of Total Alkali as Water Soluble, Percent | |
|---|---|---|---|---|---|---|
| | $Na_2O$ | $K_2O$ | $Na_2O$ | $K_2O$ | $Na_2O$ | $K_2O$ |
| Dust not heated | 1.44 | 10.00 | 0.52 | 6.20 | 36.1 | 62.0 |
| Dust heated one hour at about 1200 degrees Fahrenheit | 0.98 | 9.80 | 0.39 | 6.68 | 39.8 | 68.2 |

*Example 3.*—Another portion of the dust, whose analysis is given in Samples A and B was agglomerated as in Example 2 with ten percent water and placed in the electric muffle at about 1750 degrees Fahrenheit for one hour. The results were as follows:

| | Total Alkali, Percent | | Water Soluble, Percent | | Percent of Total Alkali as Water Soluble, Percent | |
|---|---|---|---|---|---|---|
| | $Na_2O$ | $K_2O$ | $Na_2O$ | $K_2O$ | $Na_2O$ | $K_2O$ |
| Dust not heated | 1.44 | 10.00 | 0.52 | 6.20 | 36.1 | 62.0 |
| Dust heated one hour at about 1750 degrees Fahrenheit | 1.29 | 10.10 | 1.22 | 9.70 | 94.6 | 96.1 |

*Example 4.*—To a portion of Portland cement kiln dust recovered from a "Cottrell Precipitator" was added about 33.8 percent by weight limestone. The materials were thoroughly mixed and upon analysis in a manner after that of Sample A, gave the following breakdown:

Percent by weight
$SiO_2$ ---------------------------------- 11.42
$Al_2O_3$ --------------------------------- 4.93
$Fe_2O_3$ --------------------------------- 2.67
$CaO$ ----------------------------------- 38.38
$MgO$ ---------------------------------- 1.29
$SO_3$ ----------------------------------- 8.82
Ignition loss ---------------------------- 21.53
Total $Na_2O$ ---------------------------- 0.97
Total $K_2O$ ----------------------------- 6.90

The alkali metal oxide water solubility of this material was tested in accordance with the method of Sample B and found to be as follows:

Percent by weight
"Uncombined" $Na_2O$ ------------------- 0.35
"Uncombined" $K_2O$ -------------------- 4.70

Water was then added to another portion of this dust and mixed with 33.8 percent limestone until the water content reached about 10 percent by weight of the total mixture. The agglomerated sample was placed in a cylindrical pipe press and compacted under about 4000 pounds per square inch pressure into a single pellet of about one and three-quarters inches in diameter. This pellet was placed in the muffle as in Example 1 and heated for one hour at about 1200 degrees Fahrenheit. Upon removal the pellet was cooled, broken up and found to analyze as follows:

| Total Alkali, Percent | | Water Soluble, Percent | | Percent of Total Alkali as Water Soluble, Percent | |
|---|---|---|---|---|---|
| $Na_2O$ | $K_2O$ | $Na_2O$ | $K_2O$ | $Na_2O$ | $K_2O$ |
| 1.12 | 8.60 | 0.75 | 7.10 | 67.0 | 82.6 |

*Example 5.*—Another sample of "Cottrell Precipitator" dust material admixed with 33.8 percent limestone whose analysis is shown in Example 4 was also agglomerated with 10 percent water and compacted into a pellet as in Example 4. This pellet was then placed in the muffle and heated to about 1750 degrees Fahrenheit for one hour. The results are as follows:

| Total Alkali, Percent | | Water Soluble, Percent | | Percent of Total Alkali as Water Soluble, Percent | |
|---|---|---|---|---|---|
| $Na_2O$ | $K_2O$ | $Na_2O$ | $K_2O$ | $Na_2O$ | $K_2O$ |
| 1.12 | 8.60 | 1.06 | 8.30 | 94.7 | 96.5 |

LEACHING AND RECOVERY

After the kiln flue dust has been solubilized to render the alkalies therein more readily soluble in water, the solubilized dust is then mixed with an aqueous medium, such as water, to dissolve out a substantial proportion of the solubilized materials in the heat-treated dust. This leaching operation may be conducted in any one of a number of suitable ways, and those methods described herein are not to be construed as limiting except as defined in the appended claims. The leaching can be done batchwise, using agitation where necessary to keep the insoluble components in suspension. Another general procedure is to use a continuous settling apparatus, such as a "Dorr Settler" supplied by the Dorr-Oliver Company, wherein the leaching and separation of the solids from the leaching liquid are carried out in one main stage.

A preferred method of leaching is to conduct a countercurrent extraction operation. In this method the solubilized dust is fed into the top part of the apparatus and the aqueous leaching medium into the bottom part. The solids settle down through the upward flowing column of aqueous medium coming into contact with liquid progressively less concentrated with alkali metal oxides and are drawn off the bottom as a thick slurry. During the time interval allowed for the solubilized dust to settle through the uprising column of liquid, the alkali metal oxides are leached out of the dust as soluble salts at increasing concentration differentials so that the slurry drawn off the bottom has substantially less alkali metal oxides in it than had the entering solubilized dust. Similarly, as the aqueous medium rises through the dust to the top of the column the liquid becomes more and more concentrated with alkali metal salts as it comes in contact with the dust particles having the greater content of soluble alkali metal oxides. The liquid exiting out of the top of the apparatus has relatively very little insoluble dust in it and contains a substantial amount of the soluble alkali metal salts formerly in the solubilized dust. The concentration of the alkali metal oxides in the liquid can be controlled by adjusting the relative inflow of aqueous medium to dust. The alkali metal salts are present mainly as sodium and potassium sulfates and hydroxides, but they may be present in other forms too, such as their chlorides, carbonates, silicates, and aluminates.

The leaching conditions of the solubilized dust depend on the particle size of the compacted or agglomerated dust, as well as the degree of compaction. It has been discovered that finer particles and more loosely compacted particles can be leached more readily than the larger or more tightly compacted particles.

In addition it has been discovered that when warmer temperatures are used in the leaching operation, the leaching is effected more rapidly. Thus it may be desirable to leach the solubilized dust in its hot condition as it is withdrawn from the solubilizing step in the process. When the dust has been solubilized in the absence of moisture it is preferred to further agglomerate it with an aqueous agglomerating medium and thereby diminish the dustiness and increase its ease of handling. The aqueous medium added in this subsequent agglomeration step may be elevated in temperature or the dust itself may be agglomerated while hot.

Further, at higher temperatures water has a greater solubility capacity for the alkali metal salts, and thus, at these higher temperatures the concentration differential between the solubilized dust and the leaching solution would be greater, which aids in the leaching operation. Further, if the solubilized dust is fed into the leaching apparatus while still hot, as the leaching solution travels up the countercurrent extraction column, for instance, the solution is warmed and this increases the capacity to approach the higher concentrations needed for further adapting the solution for subsequent use as a fertilizer component. Also, at higher temperatures the viscosity of the leaching solution tends to decrease. This permits more rapid penetration of the liquid medium into the solubilized dust particles and decreases the amount of fine particles in the decanted solution. It is preferred to use heated leaching solution as well as heated solubilized dust, for in this manner even higher leaching temperatures may be obtained.

Where the leaching operation is conducted batchwise or in a semicontinuous manner, such as in a "Dorr Settler," it is desirable to recycle the aqueous leaching medium to concentrate it further. Several progressive leaching stages may be needed to increase the percentage of alkali metal salts in solution.

In general, as little water as possible should be used to effect the leaching process. This amount will depend on the efficiency of the extraction apparatus and other factors such as the amount of water retained in the damp leached dust, the concentration of alkali metal salts in the leach water, the temperature, the treated dust particle sizes, etc. Ratios of dust to water ranging from as high as about 5:1 to as low as about one to fifty have been used. A range of dust to water of between about two to one and about one to six, is preferred.

In the countercurrent extraction process, or in a batch settling method, the slurry of solids is withdrawn and may be used directly at an intermediate point in the cement manufacturing process. Where the leached dust is to be returned to a point in the cement manufacturing process, it may be highly desirable to have the water content as low as economically convenient. Thus, filtering the damp material to remove more water may be desirable. Any suitable filtering method such as centrifuging, decantation, or batch or continuous filtration, may be used.

The treated dust after solubilizing and leaching, is particularly adaptable for recycling through the cement kiln. Any suitable method of recycle may be used without departing from the scope of this invention except as defined in the appended claims. In the "wet" process of Portland cement manufacture, it may be desirable to recycle the leached dust as a slurry to the raw material filtering operation where used. It also may be preferred to feed the treated dust directly into the kiln or to mix the treated dust with the feed to the kiln. It has been found that the heat treated dust has sufficient hydraulic properties so that it can be blended with the clinker product of the cement kiln. The clinker materials and the heat treated dust may be ground together in a manner similar to the usual procedure for working up the clinker into a finished product. Still another method of recycling the treated dust would be to a separate kiln for making a special clinker from the dust. This would be used in large cement plants where the amount of dust removed would economically justify such a plan. Using this method, the present manufacturing operations would not be altered and the recycled dust would be used directly as additional clinker product to be further processed into additional cement.

Where the dust is being recycled, it may be desirable to admix with the treated dust other materials, such as lime, limestone, clay, sand, or gypsum. This may be done at any suitable point in the process to bring the composition of the treated dust more into conformity with what it should be at the point to which it is being recycled.

Samples of the heat-treated dust recovered in Examples 2, 3, 4 and 5 were broken up and in each case, the portion passing through a four-mesh standard screen but retained on an eight-mesh standard screen was placed in a vessel and water added in the ratio of fifty parts water to one part by weight of heat-treated dust. Each mixture was heated at between about 180 and 210 degrees Fahrenheit for one hour and then the slurry was poured onto filter paper. The solids retained on the filter paper were then dried in an oven without further washing. The alkali analysis on each dried leached dust material showed a reduction in both the total alkali and the water-soluble alkali content as follows:

*Comparison of alkali content*

(Example 2)

|  | Raw Dust, percent | Heat-Treated Dust, percent | Leached Heat-Treated Dust, percent |
|---|---|---|---|
| Total Alkali: |  |  |  |
| $Na_2O$ | 1.44 | 0.98 | 0.74 |
| $K_2O$ | 10.00 | 9.80 | 3.10 |
| Water-Soluble: |  |  |  |
| $Na_2O$ | 0.52 | 0.39 | 0.00 |
| $K_2O$ | 6.20 | 6.68 | 0.08 |

(Example 3)

|  | Raw Dust, percent | Heat-Treated Dust, percent | Leached Heat-Treated Dust, percent |
|---|---|---|---|
| Total Alkali: | | | |
| $Na_2O$ | 1.44 | 1.29 | 0.11 |
| $K_2O$ | 10.00 | 10.10 | 1.12 |
| Water-Soluble Alkali: | | | |
| $Na_2O$ | 0.52 | 1.22 | 0.00 |
| $K_2O$ | 6.70 | 9.70 | 0.12 |

(Example 4)

|  | Raw Dust, percent | Heat-Treated Dust, percent | Leached Heat-Treated Dust, percent |
|---|---|---|---|
| Total Alkali: | | | |
| $Na_2O$ | 0.97 | 1.12 | 0.37 |
| $K_2O$ | 6.90 | 8.60 | 1.50 |
| Water-Soluble Alkali: | | | |
| $Na_2O$ | 0.35 | 0.75 | 0.00 |
| $K_2O$ | 4.70 | 7.10 | .03 |

(Example 5)

|  | Raw Dust, percent | Heat-Treated Dust, percent | Leached Heat-Treated Dust, percent |
|---|---|---|---|
| Total Alkali: | | | |
| $Na_2O$ | .97 | 1.12 | 0.05 |
| $K_2O$ | 6.90 | 8.60 | 0.42 |
| Water-Soluble Alkali: | | | |
| $Na_2O$ | .35 | 1.06 | 0.00 |
| $K_2O$ | 4.70 | 8.30 | 0.14 |

From the foregoing it will be seen that the effect of the treatment as herein disclosed has been to reduce both the total alkali content and the water-soluble alkali content of the treated dust to such proportions that no difficulty was encountered in using the treated dust as a raw material in cement manufacture. The alkali was recovered in the leaching solution and was available for subsequent use as desired.

Although this invention has been described with particular respect to kiln dust recovered from cement plants, whether they be of the "dry" or "wet" process or for making "Portland" or some other type of artificial cement, the invention is not to be limited thereto except as defined in the appended claims, for the process also may be useful in treating substantially inorganic dust materials recovered from other type plants, such as ore blast furnaces, coal burning plants and the like, and which has contained therein chemically combined alkalies or alkalies in such a state of union with the dust that they are not readily soluble in an aqueous medium.

From the foregoing it will be seen that our invention consists in heat-treating cement kiln flue dusts by first agglomerating the recovered dust, heating the agglomerated dust, and thereafter leaching the water-soluble alkali metal oxides therefrom to produce a solid residue which is useful in cement manufacture and a liquid solution which has valuable chemical properties which permit its subsequent use in fertilizer manufacture.

The invention claimed is:

1. The process of treating cement kiln flue dust which has therein theoretical alkalies which are not readily soluble in an aqueous medium, which comprises heating the dust to a temperature of at least 1000° F. in an oven for a time sufficient to increase the solubility of the alkalies in an aqueous medium, treating the resultant heat-treated dust with an aqueous medium to dissolve a substantial amount of the water-soluble materials, and separating said aqueous medium from the solid particles of the treated dust.

2. The method of treating a substantially inorganic dust as claimed in claim 1 and further characterized in that the dust is agglomerated by addition of an aqueous agglomerating medium, prior to the heat-treatment thereof.

3. The method of treating a substantially inorganic dust as claimed in claim 1 and further characterized in that the heat-treated dust is subjected to countercurrent extraction with an aqueous medium to remove a substantial amount of the water-soluble materials therefrom.

4. The method of treating a substantially inorganic dust as claimed in claim 1 and further characterized in that the dust is agglomerated by addition of an aqueous agglomerating medium, prior to the heat-treatment thereof, and the heat-treated dust is subjected to countercurrent extraction with an aqueous medium to remove a substantial amount of the water-soluble materials therefrom.

5. The method of treating a substantially inorganic dust as claimed in claim 1 and further characterized in that the dust is heat-treated at a temperature of between approximately 1000 degrees Fahrenheit, and the fusion temperature of the dust.

6. The method of treating a substantially inorganic dust as claimed in claim 1 and further characterized in that the dust is agglomerated prior to heat-treatment by addition of from between about three percent and about thirty percent of an aqueous medium with from between approximately 0.01 percent to approximately ten percent of calcium chloride.

7. The method of treating a substantially inorganic dust as claimed in claim 1 and further characterized in that the dust is agglomerated by addition of from between approximately one percent and approximately thirty percent of an aqueous medium and is pressure compacted prior to the heat-treatment thereof.

8. The method of treating a substantially inorganic dust as claimed in claim 1 and further characterized in that the dust is agglomerated by addition of from between approximately three percent and approximately thirty percent of an aqueous medium, and is nodulized and compacted at pressures below about 10,000 pounds per square inch, prior to being subjected to heat-treatment.

9. The method of treating a substantially inorganic dust as claimed in claim 1 and further characterized in that the dust is heat-treated in the presence of from between approximately 0.01 percent and approximately ten percent calcium chloride.

10. In a process for rendering recovered cement kiln flue dust suitable for recycle to an intermediate point in the manufacture of cement, the improvement which comprises heat-treating the dust to a temperature of at least 1000° F. in an oven for a time sufficient to render a major portion of the alkalies present in the dust soluble in an aqueous medium, thereafter leaching the soluble alkalies from the dust by means of an aqueous medium, and then separating the liquid component from the solid particles of dust and charging the dust to the kiln.

11. In a process for rendering recovered cement kiln flue dust suitable for recycle to an intermediate point in the manufacture of cement as claimed in claim 10 and further characterized in that the dust is aggolomerated prior to the heat-treatment thereof.

12. In a process for rendering recovered cement kiln flue dust suitable for recycle to an intermediate point in the manufacture of cement as claimed in claim 10 and further characterized in that the dust is agglomerated by addition of an aqueous agglomerating medium, prior to the heat-treatment thereof.

13. In a process for rendering recovered cement kiln flue dust suitable for recycle to an intermediate point in the manufacture of cement as claimed in claim 10 and further characterized in that the dust is agglomerated by addition of an aqueous agglomerating medium, prior to the heat-treatment thereof, said aqueous medium comprising from approximately one percent to approximately thirty percent by weight of the untreated dust.

14. In a process for rendering recovered cement kiln flue dust suitable for recycle to an intermediate point in the manufacture of cement as claimed in claim 10 and further characterized in that the dust is agglomerated by addition of an aqueous agglomerating medium and is nodulized, prior to the heat-treatment thereof.

15. In a process for rendering recovered cement kiln flue dust suitable for recycle to an intermediate point in the manufacture of cement as claimed in claim 10 and further characterized in that the dust is agglomerated by addition of an aqueous agglomerating medium and is pressure compacted, prior to the heat-treatment thereof.

16. In a process for rendering recovered cement kiln flue dust suitable for recycle to an intermediate point in the manufacture of cement as claimed in claim 10 and further characterized in that the dust is agglomerated by addition of an aqueous agglomerating medium, prior to the heat-treatment thereof, and the leaching liquid is flowed countercurrent with the heat-treated agglomerated dust.

17. In a process for rendering recovered cement kiln flue dust suitable for recycle to an intermediate point in the manufacture of cement as claimed in claim 10 and further characterized in that the dust is agglomerated by addition of an aqueous agglomerating medium, said aqueous medium containing calcium chloride in an amount of from approximately 0.01 percent to approximately ten percent of the said aqueous medium.

References Cited in the file of this patent

UNITED STATES PATENTS

| | | |
|---|---|---|
| 1,124,798 | Peacock | Jan. 12, 1915 |
| 1,220,989 | Huber | Mar. 27, 1917 |
| 1,239,616 | Newberry | Sept. 11, 1917 |
| 1,249,708 | Anderson | Dec. 11, 1917 |
| 1,354,642 | Anderson | Oct. 5, 1920 |
| 2,244,194 | Haglund | June 3, 1941 |

FOREIGN PATENTS

| | | |
|---|---|---|
| 713,546 | Great Britain | Aug. 11, 1954 |